US012738246B2

(12) United States Patent
Chien

(10) Patent No.: US 12,738,246 B2
(45) Date of Patent: Sep. 15, 2026

(54) LIQUID CRYSTAL DISPLAY MODULE CAPABLE OF BEING USED IN LOW TEMPERATURE ENVIRONMENT

(71) Applicant: PowerView Display Corporation, Hsinchu County (TW)

(72) Inventor: Cheng-Pang Chien, Hsinchu County (TW)

(73) Assignee: POWERVIEW DISPLAY CORPORATION, Hsinchu County (TW)

( * ) Notice: Subject to any disclaimer, the term of this patent is extended or adjusted under 35 U.S.C. 154(b) by 1 day.

(21) Appl. No.: 18/809,388

(22) Filed: Aug. 20, 2024

(65) Prior Publication Data

US 2026/0057855 A1 Feb. 26, 2026

(51) Int. Cl.
*G09G 3/36* (2006.01)

(52) U.S. Cl.
CPC ..... *G09G 3/3677* (2013.01); *G09G 2320/041* (2013.01); *G09G 2330/045* (2013.01)

(58) Field of Classification Search
CPC ...... G09G 3/36; G09G 3/3607; G09G 3/3611; G09G 3/3614; G09G 3/3622; G09G 3/3625; G09G 3/364; G09G 3/3644; G09G 3/3648; G09G 3/3659; G09G 3/3666; G09G 3/3674; G09G 3/3677; G09G 3/3681; G09G 3/3685; G09G 3/3688; G09G 3/3692; G09G 3/3696; G09G 2320/041; G09G 2320/045; G09G 2320/048
USPC .................................................. 345/87–104
See application file for complete search history.

(56) References Cited

U.S. PATENT DOCUMENTS

2001/0024250 A1* 9/2001 Fujishiro ............... G02F 1/1336 349/65
2005/0046760 A1* 3/2005 Usami .................... B60K 35/81 349/17
2006/0066550 A1* 3/2006 Huang ................. G09G 3/3648 345/92
2006/0070280 A1* 4/2006 Yamamura ............... H04N 5/64 40/564
2006/0192750 A1* 8/2006 Lai .................... G02F 1/133604 345/102
2008/0088554 A1* 4/2008 Lee ...................... H05B 41/285 345/87
2008/0101065 A1* 5/2008 Hsu ......................... F21V 29/67 362/234
2009/0040169 A1* 2/2009 Chang ............... G02F 1/133385 345/101

(Continued)

*Primary Examiner* — Ke Xiao
*Assistant Examiner* — Nelson Lam
(74) *Attorney, Agent, or Firm* — WPAT, PC

(57) ABSTRACT

A liquid crystal display module capable of being used in a low temperature environment is provided. The liquid crystal display module includes an LCD panel. The LCD panel includes a GOA circuit. The liquid crystal display module is equipped with a temperature sensor and a heating device. The temperature sensor and the heating device are located beside the GOA circuit. When the temperature sensor detects that the ambient temperature is close to a threshold temperature (e.g., 0° C.), the heating device starts heating. That is, the GOA circuit is not affected by the low temperature. Consequently, the GOA circuit will not fail, and the GOA circuit can be operated normally.

9 Claims, 3 Drawing Sheets

(56) References Cited

U.S. PATENT DOCUMENTS

| | | | | | |
|---|---|---|---|---|---|
| 2009/0040417 | A1* | 2/2009 | Nagaoka | G02F 1/133604 | 349/58 |
| 2010/0001943 | A1* | 1/2010 | Leo | G02F 1/133382 | 345/101 |
| 2010/0194675 | A1* | 8/2010 | Yoshida | G02F 1/133385 | 349/72 |
| 2012/0249402 | A1* | 10/2012 | Kang | H05K 7/20972 | 345/87 |
| 2013/0148052 | A1* | 6/2013 | Huang | G02F 1/133603 | 349/61 |
| 2013/0195141 | A1* | 8/2013 | Koudo | G01K 7/00 | 374/170 |
| 2015/0213767 | A1* | 7/2015 | Takagi | F21V 23/0457 | 362/382 |
| 2016/0042712 | A1* | 2/2016 | Su | G09G 3/3696 | 345/212 |
| 2019/0272795 | A1* | 9/2019 | Xu | G09G 3/36 | |
| 2020/0225515 | A1* | 7/2020 | Lv | G09G 3/006 | |
| 2021/0116740 | A1* | 4/2021 | Zhang | G02F 1/133382 | |
| 2023/0137579 | A1* | 5/2023 | Wu | H10K 50/87 | 345/694 |

* cited by examiner

LIQUID CRYSTAL DISPLAY MODULE CAPABLE OF BEING USED IN LOW TEMPERATURE ENVIRONMENT

FIELD OF THE INVENTION

The present invention relates to a liquid crystal display module, and more particularly to a liquid crystal display module capable of being used in a low temperature environment.

BACKGROUND OF THE INVENTION

Nowadays, many electronic products are equipped with display devices. The display device usually includes a liquid crystal display module. FIG. 1 schematically illustrates the application of a display module.

As shown in FIG. 1, a liquid crystal display module 110 is embedded in the back of an airplane seat for passengers to enjoy various programs in the airplane. Generally, this liquid crystal display module 110 is a detachable liquid crystal display module. Due to the economic consideration or the shorter flight, the liquid crystal display module 110 can be removed from the back of the seat by the airline. Of course, the display module can be installed in more places. For example, the display module can be installed in a car or installed in a processing machine.

For example, in case the liquid crystal display module is installed in a car, the driver or the passengers can use the display screen of the liquid crystal display module to navigate, listen to music, or watch programs while the car is driven. However, in some special environments, the liquid crystal display module may not work properly. For example, in high-latitude or polar environments where the temperature is often below zero, the LCD panel in the liquid crystal display module may not work properly. Similarly, if the processing machine is located in a high-latitude factory, the liquid crystal display module may not work properly in a low-temperature environment.

FIG. 2A is a schematic diagram of a conventional LCD panel. The LCD panel 200 includes plural pixels. The plural pixels are formed on a glass substrate 210 and arranged in an array structure. The array structure is located in a display region 250 of the LCD panel 200.

A gate driver 220 is disposed on the LCD panel 200. The gate driver 220 is connected with plural gate lines $G_1$~$G_6$ on the LCD panel 200. The pixels in each row are connected with the corresponding gate line of the gate lines $G_1$~$G_6$. For example, the pixels in the first row are connected with the gate line $G_1$, and the pixels in the second row are connected with the gate line $G_2$. The rest may be deduced by analogy.

Furthermore, a source driver 230 is located outside the LCD panel 200. The source driver 230 is connected with plural data lines $D_1$~$D_5$ on the LCD panel 200. The pixels in each column are connected with the corresponding data line of the data lines $D_1$~$D_5$. For example, the pixels in the first column are connected to the data line $D_1$, and the pixels in the second row are connected with the data line $D_2$. The rest may be deduced by analogy.

During the normal operation, the gate driver 220 sequentially generates pulses to the corresponding gate lines $G_1$~$G_6$, and the source driver 230 generates display data to the data lines $D_1$~$D_5$.

When the gate driver 220 generates a first pulse to the gate line $G_1$ and the source driver 230 generates the display data to the data lines $D_1$~$D_5$, the pixels in the first row receive the display data from the corresponding data lines $D_1$~$D_5$. Sequentially, when the gate driver 220 generates a second pulse to the gate line $G_2$ and the source driver 230 generates the display data to the data lines $D_1$~$D_5$, the pixels in the second row receive the display data from the corresponding data lines $D_1$~$D_5$. The rest may be deduced by analogy. In addition, the pixels in the array structure will display the corresponding color and the corresponding brightness according to the received display data. Consequently, an image corresponding to the pixels in the array structure will be displayed in the display region 250 of the LCD panel 200.

Generally, the relevant circuits in the gate driver 220 are packaged in an IC chip. That is, the IC chip of the gate driver 220 is adhered to a non-display region on the glass substrate 210 other than the display region 250 on the glass substrate 210. In addition, the IC chip of the gate driver 220 is directly connected to the gate lines $G_1$~$G_6$. Consequently, the LCD panel 200 shown in FIG. 2A is also referred as a chip on glass LCD panel (or a COG panel for short). Similarly, the source driver 230 is also packaged in an IC chip. The IC chip of the source driver 230 is adhered to an external circuit board and connected to the plural data lines $D_1$~$D_5$ on the LCD panel 200 through a flexible flat cable (not shown).

In the LCD panel 200, the region other than the display region 250 is a non-display region. Generally, the non-display region and the gate driver 220 are sheltered by an edge frame of the display device. Consequently, when the image is displayed on the LCD panel 200, only the portion of the image in the display region 250 can be viewed by the viewer, but the IC chip of the gate driver 220 in the non-display region cannot be viewed.

In order to simplify the manufacturing process of the LCD panel, a gate on array circuit (i.e., a GOA circuit) with the similar function of the gate driver 220 is directly formed on the glass substrate. Therefore, there is no needed to perform a process of attaching the IC chip of the gate driver 220 to the non-display region on the glass substrate 210. The GOA circuit is composed of many thin-film transistors. In the GOA circuit, thin-film transistors are constructed in the non-display region of the glass substrate and connected with the gate lines $G_1$~$G_6$. As known, the size of the thin-film transistor is very small, and the thin-film transistor is a transparent transistor. That is to say, the layout area of the GOA circuit is very small, and the area of the non-display region can be reduced.

FIG. 2B is a schematic diagram of another conventional LCD panel. The LCD panel 260 includes plural pixels. The plural pixels are formed on a glass substrate 270 and arranged in an array structure (not shown). The array structure is located in a display region 290 of the LCD panel 260.

Furthermore, a GOA circuit 280 is formed on the LCD panel 260. The GOA circuit 280 is connected with plural gate lines (not shown) on the LCD panel 260. The GOA circuit 280 is included in a non-display region on the LCD panel 260 other than the display region 290.

Similarly, a source driver 230 is located outside the LCD panel 260. The source driver 230 is connected with plural data lines on the LCD panel 260 through a flexible flat cable 235. Like FIG. 2A, the pixels on the LCD panel 260 are arranged in the array structure. The operating principles of the LCD panel 260 are similar to those of the LCD panel 200 shown in FIG. 2A, and not redundantly described herein.

As known in the art, the thin-film transistors are not suitable for operation in a low temperature environment. That is to say, since the GOA circuit 280 composed of many thin-film transistors is directly exposed to the external environment, the GOA circuit 280 cannot withstand the special low-temperature environment. In case that the ambient temperature of the LCD panel 260 is too low, the GOA circuit 280 will fail, and thus the LCD panel 200 is unable to be operated normally.

Furthermore, the manufacturers of the LCD panels 200 and 260 provide information about the ambient temperature at which the LCD panels 200 and 260 can be operated normally. For example, the LCD panel 200 with the IC chip of the gate driver 220 can be operated normally in an environment of 70° C. to −20° C., and the LCD panel 260 with the GOA circuit 280 can only be operated normally in an environment of 60° C. to 0° C. In other words, when the ambient temperature is lower than 0° C., the LCD panel 260 is possibly unable to display the image normally.

Generally, the manufacturer cannot guarantee that the LCD panel 260 with the GOA circuit 280 is capable of being operated normally in an environment below zero degree. Consequently, the LCD panel 260 cannot be used in the high-latitude environments or the polar regions where the temperature is often below zero degrees.

SUMMARY OF THE INVENTION

An embodiment of the present invention provides a liquid crystal display module. The liquid crystal display module includes a backlight unit, an LCD panel, a front cover, a first temperature sensor, and a heating device. The backlight unit includes a heat sink, a backlight source, and a frame. A lateral side of the backlight source is surrounded by the frame. The backlight source is installed in a first opening of the frame. The backlight source is in contact with a surface of the heat sink. The frame is in contact with an inner sidewall of the heat sink. The LCD panel is installed in a second opening of the frame. The LCD panel includes a display region and a non-display region. A GOA circuit is formed on the non-display region. A top surface of the front cover is located over the heat sink and the frame. A lateral side of the front cover is in contact with an outer sidewall of the heat sink. The top surface of the front cover has a hollow portion. The display region of the LCD panel is exposed to the hollow portion. The first temperature sensor is installed on the non-display region of the LCD panel and adjacent to the GOA circuit. The heating device is installed on the non-display region of the LCD panel and adjacent to the GOA circuit.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention proposes a liquid crystal display module capable of being used in a low temperature environment. The liquid crystal display module includes an LCD panel. The LCD panel includes a GOA circuit. In an embodiment, the liquid crystal display module is equipped with a temperature sensor and a heating device. The temperature sensor and the heating device are located beside the GOA circuit. When the temperature sensor detects that the ambient temperature is close to a threshold temperature (e.g., 0° C.), the heating device starts heating. That is, the GOA circuit is not affected by the low temperature. Consequently, the GOA circuit will not fail, and the GOA circuit can be operated normally. The structure and operation of the liquid crystal display module will be described in more detail as follows.

Figure 1:
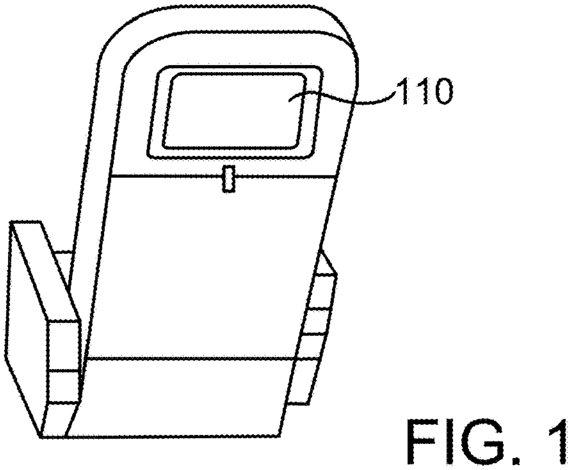
FIG. 1 (PRIOR ART)
FIG. 1 (prior art) schematically illustrates the application of a display module.
Figure 2A:
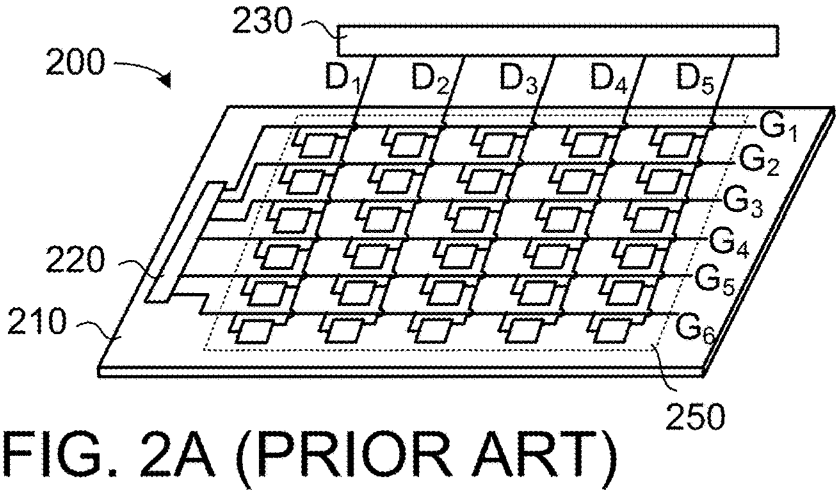
FIG. 2A (PRIOR ART)
FIG. 2A (prior art) is a schematic diagram of a conventional LCD panel.
Figure 2B:
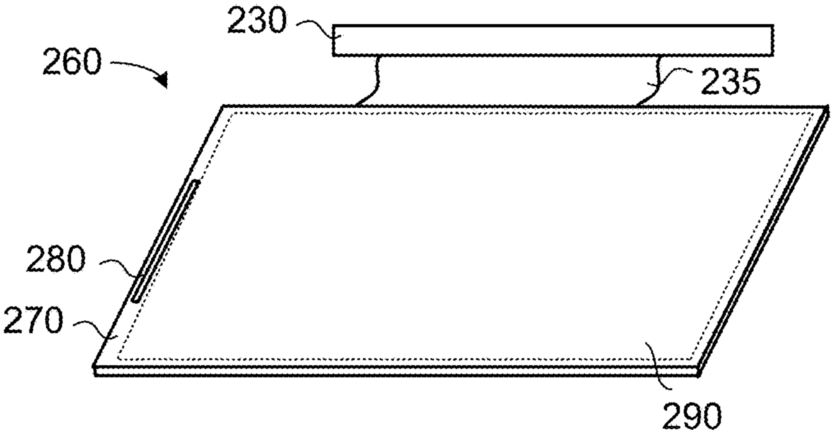
FIG. 2B (PRIOR ART)
FIG. 2B (prior art) is a schematic diagram of another conventional LCD panel.
Figure 3A:
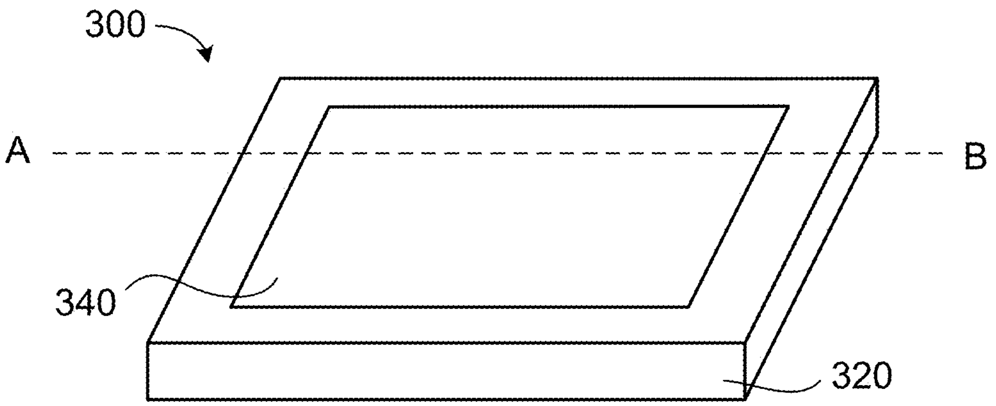
FIG. 3A is a schematic diagram illustrating the structure of a liquid crystal display module according to a first embodiment of the present invention.
Figure 3B:
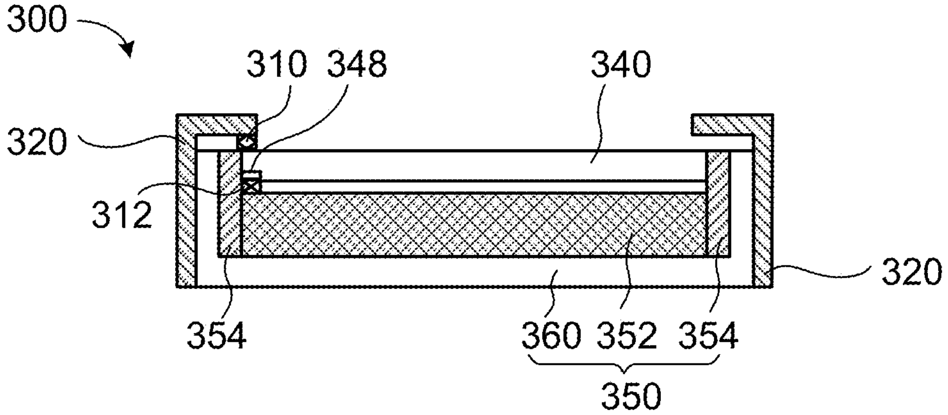
FIG. 3B is a schematic cross-sectional view illustrating the liquid crystal display module shown in FIG. 3A and taken along the dashed line AB.

FIG. 3A is a schematic diagram illustrating the structure of a liquid crystal display module according to a first embodiment of the present invention. FIG. 3B is a schematic cross-sectional view illustrating the liquid crystal display module shown in FIG. 3A and taken along the dashed line AB. In this embodiment, the liquid crystal display module 300 includes a front cover 320, a backlight unit 350, an LCD panel 340, a temperature sensor 310, and a heating device 312.

The front cover 320 is a metal front cover. The backlight unit 350 includes a heat sink 360, a backlight source 352, and a frame 354. The frame 354 is a plastic frame. The LCD panel 340 further includes a GOA circuit 348. The GOA circuit 348 is included in a non-display region of the LCD panel 340 other than the display region.

Please refer to FIG. 3B. In the backlight unit 350, the sidewall of the backlight source 352 is surrounded by the frame 354. The frame 354 is in contact with the inner sidewall of the heat sink 360. An upper opening is formed on a top side of the frame 354. The LCD panel 340 is installed in the upper opening of the frame 354. A lower opening is formed on a bottom side of the frame 354. The backlight source 352 is installed in the lower opening of the frame 354. The backlight source 352 is in contact with the bottom surface of the concave structure of the heat sink 360. In other words, the bottom side and the lateral sides of the backlight source 352 are respectively surrounded by the heat sink 360 and the frame 354. Consequently, the light beam emitted by the backlight unit 350 can only be projected to the outside of the display module 300 through the LCD panel 340.

The top surface of the front cover 320 is located over the heat sink 360, the frame 354, and the LCD panel 340. In addition, the lateral sides of the front cover 320 are in contact with the outer sidewall of the heat sink 360. The top surface of the front cover 320 has a hollow portion. The display region of the LCD panel 340 is exposed to the hollow portion of the front cover 320. The non-display region of the LCD panel 340 is sheltered by the top surface of the front cover 320. Consequently, when the LCD panel 340 is operated normally, the image displayed on the LCD panel 340 can be normally viewed.

In this embodiment, the heating device 312 is located under the LCD panel 340 and adjacent to the GOA circuit 348. The heating device 312 may cover the entire area of the GOA circuit 348. In addition, the temperature sensor 310 is located over the LCD panel 340 and adjacent to the GOA circuit 348. Since the non-display region of the LCD panel 340 other than the display region is sheltered by the top surface of the front cover 320, the temperature sensor 310 is covered by the top surface of the front cover 320.

In other words, the temperature sensor 310 is in contact with the non-display region of the LCD panel 340 and located over the GOA circuit 348. Consequently, the temperature sensor 310 can directly detect the temperature near the GOA circuit 348. In addition, the heating device 312 is in contact with the non-display region of the LCD panel 340 and is located under the GOA circuit 348. When the heating device 312 generates heat energy, the GOA circuit 348 can be heated directly, and thus the temperature near the GOA circuit 348 will be increased. Consequently, even if the liquid crystal display module 300 is used in a low temperature environment, the GOA circuit 348 can still be operated normally.

In this embodiment, the liquid crystal display module 300 further includes a controller (not shown). For example, the controller is located outside liquid crystal display module 300, and the controller is electrically connected with the temperature sensor 310 and the heating device 312 through a flexible flat cable. During the operation of the liquid crystal display module, the temperature sensor 310 detects the temperature near the GOA circuit 348. If the temperature near the GOA circuit 348 is lower than a first threshold temperature (e.g., 0° C.), the controller controls the heating device 312 to start heating. As the heating device 312 generates the heat energy, the temperature near the GOA circuit 348 rises. Consequently, the LCD panel 340 can be operated normally. Furthermore, if the temperature near the GOA circuit 348 is higher than a second threshold temperature (e.g., 5° C.), the controller controls the heating device 312 to stop heating.

It is noted that the method of controlling the heating process may be varied according to the practical requirements. In a variant example, if the temperature near the GOA circuit 348 is lower than the first threshold temperature (e.g., 0° C.), the controller controls the heating device 312 to continuously provide the heat energy until the liquid crystal display module 300 is powered off.

Figure 4:
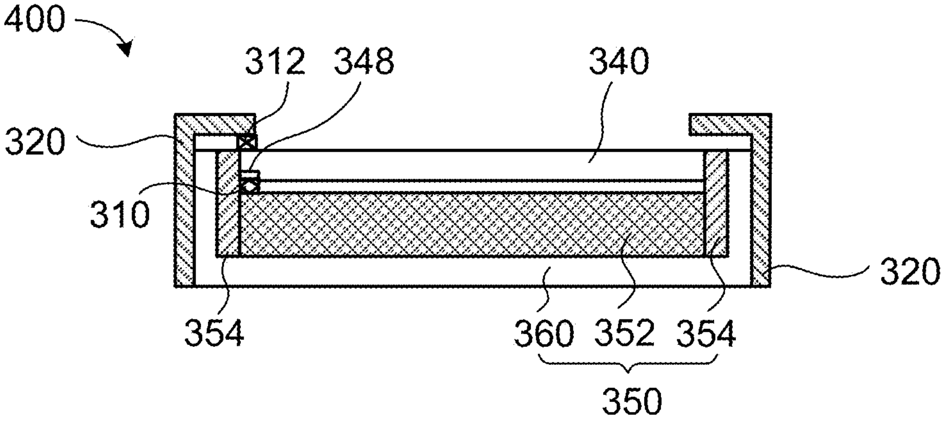
FIG. 4 is a schematic cross-sectional view illustrating a liquid crystal display module according to a second embodiment of the present invention.

FIG. 4 is a schematic cross-sectional view illustrating a liquid crystal display module according to a second embodiment of the present invention. The three-dimensional view of the liquid crystal display module in this embodiment is similar to the liquid crystal display module shown in FIG. 3A, and not redundantly described herein.

In comparison with the liquid crystal display module of the first embodiment, the locations of the temperature sensor 310 and the heating device 312 in the liquid crystal display module 400 of the first embodiment are distinguished.

In this embodiment, the heating device 312 is located over the LCD panel 340 and adjacent to the GOA circuit 348. Similarly, the heating device 312 may cover the entire area of the GOA circuit 348. In addition, the temperature sensor 310 is located under the LCD panel 340 and adjacent to the GOA circuit 348. Since the non-display region of the LCD panel 340 other than the display region is sheltered by the top surface of the front cover 320, the heating device 312 is covered by the top surface of the front cover 320.

In other words, the temperature sensor 310 is in contact with the non-display region of the LCD panel 340 and is located under the GOA circuit 348. Consequently, the temperature sensor 310 can directly detect the temperature near the GOA circuit 348. In addition, the heating device 312 is in contact with the non-display region of the LCD panel 340 and located over the GOA circuit 348. When the heating device 312 generates heat energy, the GOA circuit 348 can be heated directly, and thus the temperature near the GOA circuit 348 will be increased. Consequently, even if the liquid crystal display module 300 is used in a low temperature environment, the GOA circuit 348 can still be operated normally.

Of course, the locations of the temperature sensor 310 and the heating device 312 in the liquid crystal display module may be further adjusted. For example, in a liquid crystal display module of a third embodiment, both the temperature sensor 310 and the heating device 312 are in contact with the non-display region of the LCD panel 340 and located under the GOA circuit 348. In a liquid crystal display module of a fourth embodiment, both the temperature sensor 310 and the heating device 312 are in contact with the non-display region of the LCD panel 340 and located over the GOA circuit 348. The operations of the liquid crystal display module of the second embodiment, the third embodiment, or the fourth embodiment are similar to those of the liquid crystal display module of the first embodiment, and not redundantly described herein.

Figure 5A:
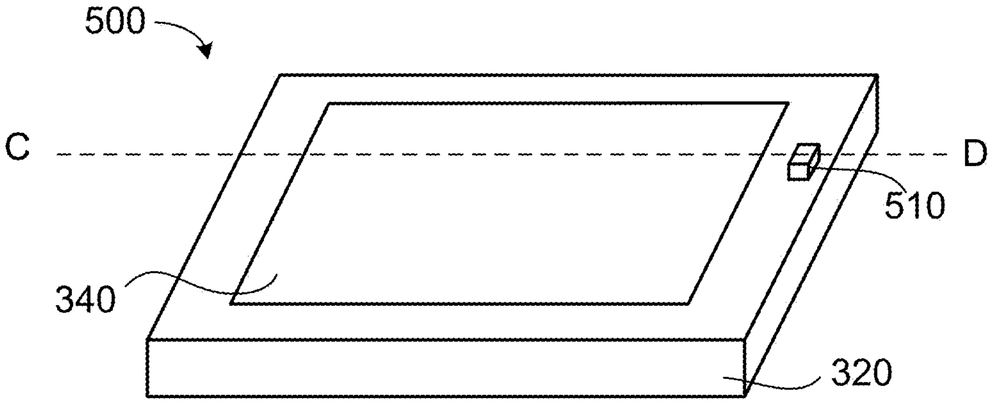
FIG. 5A is a schematic diagram illustrating the structure of a liquid crystal display module according to a fifth embodiment of the present invention.
Figure 5B:
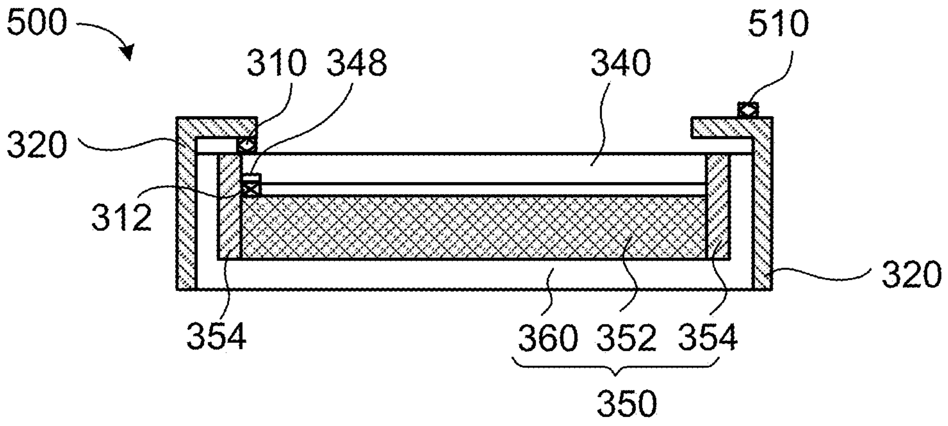
FIG. 5B is a schematic cross-sectional view illustrating the liquid crystal display module shown in FIG. 5A and taken along the dashed line CD.

In some embodiments, the liquid crystal display module includes plural temperature sensors. FIG. 5A is a schematic diagram illustrating the structure of a liquid crystal display module according to a fifth embodiment of the present invention. FIG. 5B is a schematic cross-sectional view illustrating the liquid crystal display module shown in FIG. 5A and taken along the dashed line CD. In comparison with the liquid crystal display module 300 of the first embodiment, the liquid crystal display module 500 of this embodiment further includes an additional temperature sensor 510. The additional temperature sensor 510 is electrically connected to the controller (not shown).

The temperature sensor 510 is located outside the liquid crystal display module 500. For example, the temperature sensor 510 is disposed on the top surface of the front cover 320. The temperature sensor 510 is used to detect the external ambient temperature of the liquid crystal display module 500. In a variant example, the temperature sensor 510 is not in contact with the liquid crystal display module 500, but the temperature sensor 510 is electrically connected with the controller through a signal line.

In this embodiment, the controller controls the heating device 312 according to the temperature difference between the temperatures detected by the two temperature sensors 310 and 510. During the operation of the liquid crystal display module, the temperature sensor 310 detects the temperature near the GOA circuit 348. If the temperature near the GOA circuit 348 is lower than a first threshold temperature (e.g., 0° C.), the controller controls the heating device 312 to start heating. As the heating device 312 generates the heat energy, the temperature near the GOA circuit 348 rises. Consequently, the LCD panel 340 can be operated normally. Furthermore, the driving current provided to the heating device 312 is properly adjusted by the controller according to the temperature difference between the temperatures detected by the two temperature sensors 310 and 510. If the temperature difference is higher (e.g., higher than a predetermined temperature range), the driving current provided to the heating device 312 is increased by the controller. Whereas, if the temperature difference is lower (e.g., lower than the predetermined temperature range), the driving current provided to the heating device 312 is decreased by the controller.

For example, if the external ambient temperature is −5° C. when the heating device 312 starts heating, the controller provides a first driving current to the heating device 312. Consequently, the temperature near the GOA circuit 348 is stably maintained at 2° C. Moreover, if the external ambient temperature drops to −10° C., the controller provides a second driving current to the heating device 312. Consequently, the temperature near the GOA circuit 348 is stably maintained at 2° C. The second driving current is greater than the first driving current.

Similarly, in a variant example of the liquid crystal display module of the second, third, or fourth embodiment, the liquid crystal display module is equipped with the additional temperature sensor 510. The operations are similar to those of the liquid crystal display module of the fifth embodiment, and not redundantly described herein.

From the above descriptions, the present invention proposes a liquid crystal display module capable of being used in a low temperature environment. The liquid crystal display module includes an LCD panel. The LCD panel includes a GOA circuit. The liquid crystal display module is equipped with a temperature sensor and a heating device. The temperature sensor and the heating device are located beside the GOA circuit. When the temperature sensor detects that the ambient temperature is close to a threshold temperature (e.g., 0° C.), the heating device starts heating. That is, the GOA circuit is not affected by the low temperature. Consequently, the GOA circuit will not fail, and the GOA circuit can be operated normally.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A liquid crystal display module, capable of being used in a low temperature environment, comprising:

- a backlight unit comprising a heat sink, a backlight source and a frame, wherein a lateral side of the backlight source is surrounded by the frame, the backlight source is installed in a first opening of the frame, the backlight source is in contact with a surface of the heat sink, and the frame is in contact with an inner sidewall of the heat sink;
- a liquid crystal display (LCD) panel formed on a glass substrate and installed in a second opening of the frame, wherein the LCD panel includes a display region and a non-display region, and a gate on array (GOA) circuit is formed on the non-display region;
- a front cover, wherein a top surface of the front cover is located over the heat sink and the frame, and a lateral side of the front cover is in contact with an outer sidewall of the heat sink, wherein the top surface of the front cover has a hollow portion, and the display region of the LCD panel is exposed to the hollow portion;
- a first temperature sensor installed on the non-display region of the LCD panel and adjacent to the GOA circuit, wherein the first temperature sensor detects an ambient temperature near the GOA circuit during operation of the liquid crystal display module; and
- a heating device installed on the non-display region of the LCD panel and adjacent to the GOA circuit, wherein the ambient temperature near the GOA circuit is stably maintained in the low temperature environment if the heating device starts heating.

2. The liquid crystal display module as claimed in claim 1, wherein the first temperature sensor is in contact with the non-display region of the LCD panel, and the first temperature sensor is located over the GOA circuit, wherein the heating device is in contact with the non-display region of the LCD panel, and the heating device is located under the GOA circuit.

3. The liquid crystal display module as claimed in claim 1, wherein the first temperature sensor is in contact with the non-display region of the LCD panel, and the first temperature sensor is located under the GOA circuit, wherein the heating device is in contact with the non-display region of the LCD panel, and the heating device is located over the GOA circuit.

4. The liquid crystal display module as claimed in claim 1, wherein the liquid crystal display module further includes a controller, and the controller is electrically connected with the first temperature sensor and the heating device.

5. The liquid crystal display module as claimed in claim 4, wherein if the ambient temperature near the GOA circuit is lower than a first threshold temperature, the controller controls the heating device to start heating.

6. The liquid crystal display module as claimed in claim 5, wherein if the ambient temperature near the GOA circuit is higher than a second threshold temperature, the controller controls the heating device to stop heating.

7. The liquid crystal display module as claimed in claim 4, wherein the liquid crystal display module further comprises a second temperature sensor, and the second temperature sensor is electrically connected to the controller, wherein the second temperature sensor is located outside the liquid crystal display module, and the second temperature sensor detects an external ambient temperature outside the liquid crystal display module.

8. The liquid crystal display module as claimed in claim 7, wherein if the ambient temperature near the GOA circuit is lower than a first threshold temperature, the controller controls the heating device to start heating.

9. The liquid crystal display module as claimed in claim 8, wherein if a difference between the ambient temperature and the external ambient temperature increases, a driving current provided to the heating device is increased by the controller, wherein if the difference between the ambient temperature and the external ambient temperature decreases, the driving current provided to the heating device is decreased by the controller.

* * * * *